Nov. 19, 1935.　　A. S. BERRY　　2,021,828
SOLDER EXTRUDING MACHINE
Original Filed Oct. 31, 1931　　2 Sheets-Sheet 1
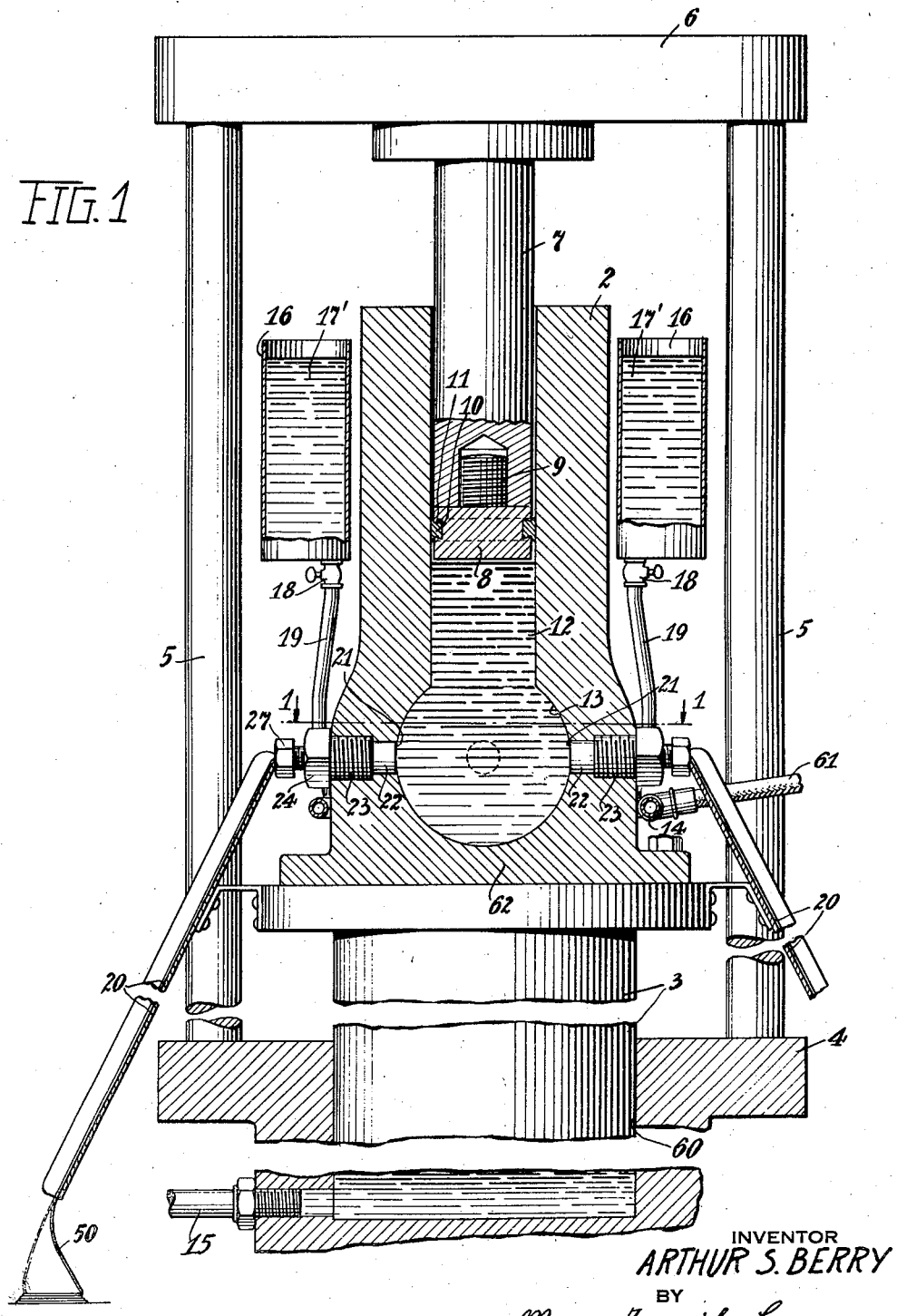
INVENTOR
ARTHUR S. BERRY
BY
Mason, Fenwick & Lawrence
his ATTORNEYS Nov. 19, 1935.  A. S. BERRY  2,021,828
SOLDER EXTRUDING MACHINE
Original Filed Oct. 31, 1931  2 Sheets-Sheet 2
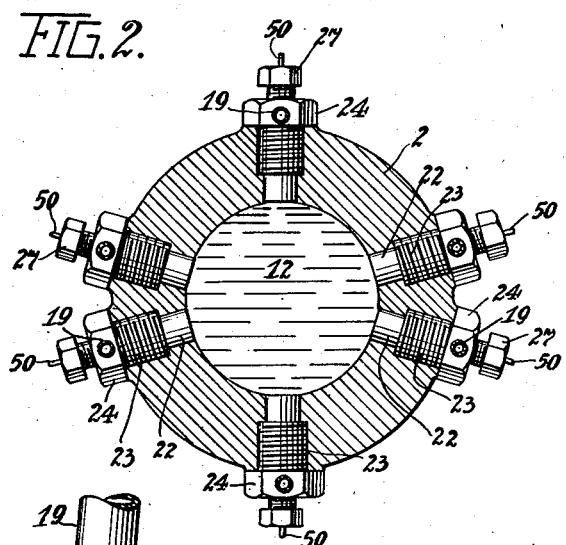
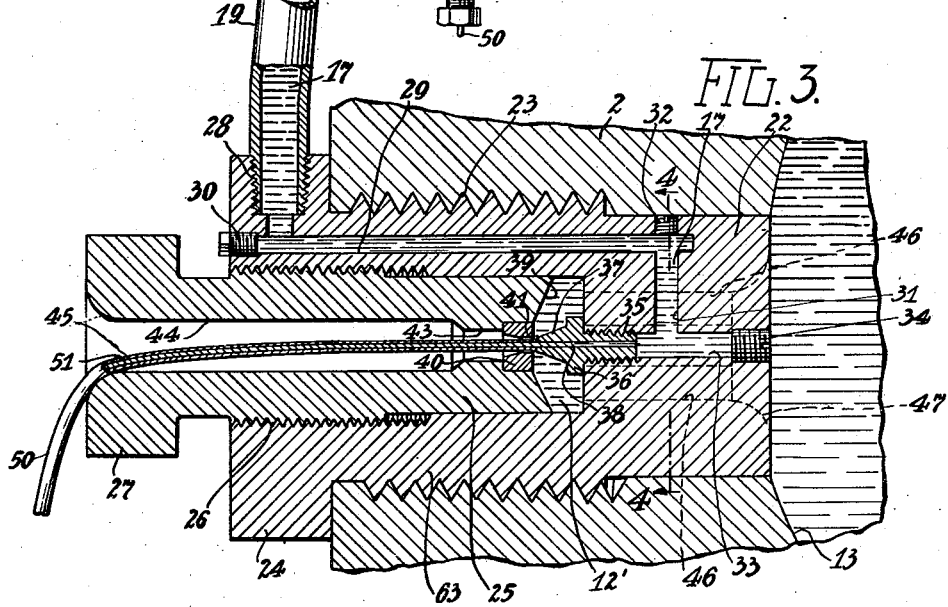
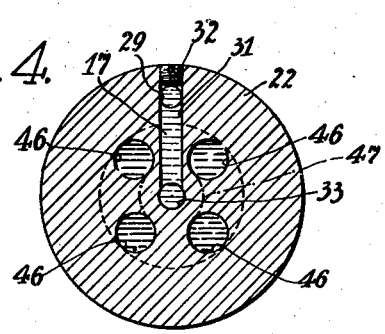
INVENTOR
ARTHUR S. BERRY
BY
Mason, Fenwick & Lawrence
his ATTORNEYS Patented Nov. 19, 1935

2,021,828

UNITED STATES PATENT OFFICE 2,021,828

SOLDER EXTRUDING MACHINE

Arthur S. Berry, Norwood, N. J., assignor to Berry Solder Co. Inc., New York, N. Y., a corporation of New York Application October 31, 1931, Serial No. 572,367
Renewed December 13, 1933

7 Claims. (Cl. 207—9)

This invention relates to improvements in solder extruding machines, and has more particular relation to improvements employed for extruding a multiplicity of complete wire solder strands each having a flux core.

The principal object of the invention is to employ a single press capable of extruding a plurality of flux core solder wires at one operation.

A further object of the invention is to provide an extruding machine in which a plurality of extruding dies are employed with a single pressure plunger and with equal pressure to all dies.

Another object of the invention is to provide a solder extruding machine having a single pressure plunger discharging into a globular chamber and mounting a plurality of extruding dies in the walls of this chamber.

The invention also has other objects, all of which will be hereinafter more particularly set forth and claimed.

In the accompanying drawings forming part of this specification,

Figure 1 represents a central vertical section partly in elevation of an extruding machine embodying my invention.

Figure 2 represents a detail horizontal section through the globular extruding chamber on the line 1—1 of Figure 1.

Figure 3 represents a detail vertical section through one of the die assemblies, and Figure 4 represents a detail vertical section through one of the dies on the line 4—4 of Figure 3.

The present invention is an improvement on the solder extruding machine shown in my pending application Serial No. 560,182, filed August 28, 1931, forfeited, and thereafter renewed on May 1, 1934.

Described in general terms, the present invention contemplates providing an extruding press containing molten metal, and which, upon the application of hydraulic power, extrudes through suitable dies semifluid or cooled metal at a plurality of points in the extruding press.

Wire solder of this nature is used in large quantities today in all classes of fine work where a solder with a self-contained flux is demanded, the flux being in proportion to the amount of solder contained in the given length of solder tube, and this flux being so located that when the solder tube is melted, the flux is also melted and flows upon the metal to be soldered to deoxidize it and thus present clean metal surfaces upon which the molten solder will take a firm hold.

Heretofore in attempting to provide a press of this nature with a plurality of extruding dies, it has been found that in view of the almost solid nature of the metal in the lower part of the extruding chamber, that any slight obstruction to the movement of this metal under the terrific hydraulic pressure, will cause a slight blockade of the metal and as it continues to cool, because of its arrested motion, will finally effect a complete blockade of a die located near that spot, so that all of the extrusion will take place from a single die and the remaining dies will be completely blocked.

With the present invention, however, the applicant has provided an extruding chamber having a perfectly globular construction. By this means, the semi-hard solder located in this chamber and subjected to many hundreds of tons pressure, meets with no obstructions in moving gradually towards the die openings, and all six of the dies shown in the present machine are thus fed evenly an equal amount of solder and with the same pressure.

This practical effect, at first blush would seem to be contrary to hydraulic teachings that pressure exerted on a chamber having a fluid content, would exert an equal pressure at all points.

The controlling factor, however, which negatives such an assumption is that the metal being extruded from the globular chamber is practically solid but of a high temperature, and would not flow at all except under extreme pressure exerted upon it. Because of this extreme pressure, and its solid nature, this solder is prevented from moving freely in all directions toward a multiplicity of dies if the slightest projection or the slightest recess should be present in the chamber, as this recess or such projection would slightly arrest the movement of the semi-fluid metal and such arresting effect would cause it to additionally chill, which would set up an added restriction of its movement and would, as has been found by practical research, soon cause the metal to flow only in such directions as where no such slowing up of movement was present. This slowing of the metal is progressive, and as the slowed metal gradually cools, finally reaches a stage where a complete obstruction to the movement of the semi-solid solder is presented in certain areas and all feed of the metal to the dies in such areas blocked.

This peculiar action of the semi-molten metal has been completely demonstrated by research in the actual hydraulic presses in use by the applicant in production of such solder, and for this reason, applicant believes he is justified in stating that without the so-called globular exit chamber for the heated solder to be extruded, it is not practical to extrude solder from a single press through a plurality of extruding dies because if such an attempt is made, very soon one die after another is blocked by the above described peculiar action of the practically solid metal until finally the entire adjusted pressure of the press is relieved by one die only, and this particular die by carrying the entire load of the adjusted pressure is very liable to break under the strain.

By reference to Figure 1 of the aforesaid drawings, it will be seen that the steel solder pot 2 is supported upon the upper end of the hydraulic ram 3 mounted in a frame 4 and operating as a piston in a hydraulic cylinder 60. The ram 3 is elevated or retracted by liquid admitted under pressure through a pipe 15 to the bottom of the cylinder 60, the pressure being created by any suitable form of compressor not shown. The liquid entering the chamber 60 causes the ram 3 to rise and when the liquid is allowed to pass out of the chamber through the pipe 15 by a suitable by-pass, the ram 3 by its own weight returns to its normal position.

The steel pot 2 is provided with an inner solder receptacle 12 and a piston 7 is mounted in this chamber which is cylindrical so as to slide up and down therein. The top of the piston 7 is connected to a cross member 6 of the press and this member 6 is, in turn, supported in position by side columns 5 which are connected to the base 4.

The lower end of the piston 7 is formed with a screw-threaded socket in which a screw-threaded extension 9 formed on a head 8 of the piston is screwed. This head 8 is formed with an annular groove 11 in which is mounted a solid copper ring 10. The office of the ring 10 is to make a close fit with the walls of the cylinder 12 to prevent any solder passing the head 8.

The copper ring has a further function of preventing undue friction between the piston 7 and the walls of the cylinder 12 such as would cause the movement of the pot 2 to be arrested when encrusted solder accumulated between the piston and the cylinder walls.

Such an action would take place if the piston fitted tight in the cylinder 12, but with the necessary clearance shown this jamming action does not take place.

Heretofore this jamming of the molten solder between the piston and the walls of the cylinder after continued operation, became so severe as to arrest the upward movement of the pot 2 or break the parts by excessive pressure from the fact that the piston 7 was jammed.

In order that the molten metal within the pot 2 may be kept in its molten state, an annular perforated gas pipe 14 is provided and suitably supported in proximity to the pot so that the burning gas from its apertures will surround the pot 2 and heat its walls sufficiently to hold the solder within the cylinder 12 in its desired semi-molten state.

A flexible pipe 61 connects the burner 14 to the source of gas supply so that this connection will remain intact as the ram 3 moves up and down.
The globular chamber 13 is located directly below the plunger chamber 12. The walls of this chamber are exactly globular in formation except, of course, at the point where the chamber communicates with the cylinder 12 and by this means the pressure exerted upon the solder within the cylinder 12 forces this solder down into the chamber 13. The location of the gas burners 14 is such that the flame from these burners heats the cylinder 12 and leaves the walls of the chamber 13 with a lower temperature, so that when the semi-molten metal from the cylinder 12 is forced into the chamber 13, it gradually cools to the right consistency for extrusion from the dies. This consistency, as far as is apparent to the eye, is practically equal to solidity, as the solder at this time and in this location is practically solid, but of a high temperature so that the extreme pressure of the ram will cause this metal to be extruded from the series of dies located in the wall of the chamber 13.

A series of containers 16, one for each die, are mounted about the melting pot, and each is provided with a pipe 19 controlled by a stopcock 18 and connects with its respective die, as best shown in Figure 3.

Each of the pipes 19, as best illustrated in this figure, is screw-threaded at its lower end as at 28, and is screwed into the head 24 of the die holder 63. This die holder is formed exteriorly with screw threads 23 by means of which it is screwed into a suitably apertured opening 21 connected with the lower end of the solder pot. The liquid resin 17¹ flows through the pipe 19, down into a passage 29 formed longitudinally in the part 63. This passage is closed at its outer end by a screw threaded plug 30 which may be removed for cleaning purposes.

A transverse passage 17 intersects the passage 29 so as to provide a passage for the liquid flux which flows downward into a centralized passage 33 formed in the die holding part 63. This centralized passage is closed by a plug 34 which may be removed for cleaning purposes, and the passage 17 is similarly provided with a plug 32. The forward end of the part 63 is hollowed out as at 12¹ to form a pressure chamber, and the interior walls screw threaded as at 26 so that the die holder 27, which is similarly provided with threads, may be screwed into the same, the chamber 12¹ connects with the chamber 13 by passages 46 formed in the head 24. The die holder 27 is apertured centrally and at its inner end formed with a recess into which the die member 40 is swedged, as best shown in Figure 3. This die 40 is formed with an orifice 41 and a flaring discharge mouth. The die member 37 which is tapered at its forward end to fit into the aperture 41 is formed with a flange 36 and a screw threaded extension 35 and also a longitudinal passage 38. When this die is screwed into the forward end of the passage 33, with its tapered end projecting within the passage 41, a predetermined clearance is left between the tapered portion of the die 37 and the wall of the aperture 41. This distance between the two die members constitutes the thickness of the walls of the solder and may be adjusted at will by running the die member 37 further into the aperture 41 or backing it up from the same. The melted flux flows into the passages 29, 17 and 33 from the container 16 and from thence flows through the passage 38 of the die member 37 and as the solder passes by pressure from the chamber 13, through the space about the tapered end of the die 37 this flux is forced into the hollow interior of the tube formed by the cooling solder and a flux core, thus produced, as shown in the sample illustrated in Figure 3.

By reference to Figure 3, it will be seen that the die member 40 has a cylindrical passage 41 therein into which projects the tapered end of the die member 37.

The adjustability of the die members is accomplished by turning the nut 27 and screwing the part 25 in and out, carrying the die member 40 with it. This adjustability, it will be understood, determines the thickness of the solder wall of the tube.

In order that the solder may freely flow from the chamber 12 and the chamber 13 to the die members, with an equal pressure at all points, the end of the member 63 is apertured as at 46 so that the semimolten solder in its passage will not be impeded in any way.

By reference to Figure 3 it will be seen that the extruded solder tube 50 having walls 45 and the resin core 51, passes out through the passage 44 in which it rapidly cools and becomes stiffer. A trough 20 supported on the head of the arm 3 receives the solder tube 50 and supports it in its downward passage, this tube becoming stiffer as it gradually cools until it is automatically deposited in a coil upon the floor of the operating room, as shown in Figure 1.

It will be understood that the peculiar globular formation of the chamber 13 as before described, will offer no obstruction to the uniform passage of the semi-molten solder to each and every one of the extruding dies and there will be no back pressures of any impeded area to gradually set up a "dam" and prevent the flow to any one die.

Having thus described my invention, what I claim as new and desire to secure by Letters Patent is:

1. In a solder extruding machine the combination with a hydraulic press including a solder forcing plunger, of a cylinder in which the plunger operates, a globular chamber at the discharge end of the cylinder, the area of any transverse section of said chamber being larger than that of said cylinder, and a plurality of extruding dies connected directly to and radiating from different parts of the globular chamber.

2. In a solder extruding press, the combination with a press proper including a plunger and cylinder, of a globular chamber into which the cylinder discharges, a plurality of dies receiving solder from the globular chamber, flux supply chambers and connection between the flux supply chambers and the dies for feeding the flux thereto.

3. In a solder extruding machine, the combination with a hydraulic press including a piston and solder cylinder, of means for heating the cylinder, a globular chamber located at the discharge end of the cylinder, the area of any transverse section of said chamber being larger than that of said cylinder, and a plurality of extruding dies connected directly to and radiating from different parts of the globular chamber.

4. In a solder extruding machine, the combination with a hydraulic press including a cylinder and plunger, of a globular chamber receiving the discharge from the cylinder, a plurality of dies connected to the globular chamber, means for heating the upper part of the cylinder to a greater extent than the globular chamber and the plurality of dies connected to the globular chamber.

5. In a solder extruding machine, the combination with a hydraulic press, including a melting pot, of a piston operating in the pot, a globular chamber located at the lower end of the pot to receive the discharge of solder therefrom and partly cool the same, a series of extruding dies connected to the globular chamber to receive a semi-fluid solder therefrom.

6. In a solder extruding machine, the combination with a hydraulic press, of a solder heating pot, a plunger operating in the pot, a globular chamber arranged at the lower end of the pot, and partly removed from the heating influence, a series of dies connected to the globular chamber and arranged to receive the semi-fluid solder in its flow about the globular walls of the cooling chamber.

7. In a solder extruding machine, the combination with a solder pot, comprising a cylinder with a globular chamber at its lower end, of a piston operating in the cylinder to exert pressure on the solder, means for heating the solder pot in the cylinder portion, a series of extruding dies connected to the globular chamber and means for introducing the flux into the several dies.

ARTHUR S. BERRY.